United States Patent
Kokubun et al.

(10) Patent No.: US 7,224,390 B2
(45) Date of Patent: May 29, 2007

(54) CMOS IMAGE SENSOR WITH VOLTAGE CONTROL CIRCUIT

(75) Inventors: Masatoshi Kokubun, Kawasaki (JP); Chikara Tsuchiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 714 days.

(21) Appl. No.: 10/318,052

(22) Filed: Dec. 13, 2002

(65) Prior Publication Data
US 2003/0146993 A1 Aug. 7, 2003

(30) Foreign Application Priority Data
Feb. 6, 2002 (JP) .............................. 2002-029633

(51) Int. Cl.
*H04N 3/14* (2006.01)
*H04N 5/335* (2006.01)
(52) U.S. Cl. ..................... 348/308; 257/291; 250/208.1
(58) Field of Classification Search ................ 348/308, 348/241, 301, 304, 302; 257/291; 250/208.1
See application file for complete search history.

(56) References Cited

U.S. PATENT DOCUMENTS

| | | | | |
|---|---|---|---|---|
| 5,923,369 | A * | 7/1999 | Merrill et al. ............... | 348/301 |
| 6,525,355 | B2 * | 2/2003 | Furumiya et al. ........... | 257/292 |
| 6,947,087 | B2 * | 9/2005 | Egawa et al. ............... | 348/304 |
| 2002/0158974 | A1 | 10/2002 | Udo et al. | |
| 2002/0163584 | A1 | 11/2002 | Kokubun et al. | |
| 2002/0175269 | A1* | 11/2002 | Krymski .................. | 250/208.1 |

FOREIGN PATENT DOCUMENTS

| | | |
|---|---|---|
| JP | 2002-330346 | 11/2002 |
| JP | 2002-330348 | 11/2002 |

* cited by examiner

*Primary Examiner*—Vivek Srivastava
*Assistant Examiner*—Gevell Selby
(74) *Attorney, Agent, or Firm*—Arent Fox LLP (57) ABSTRACT

A CMOS image sensor that reduces kTC noise in a wide band. A pixel circuit corresponding to one pixel includes a photoelectric conversion element for carrying out the photoelectric conversion of incident light, a reset transistor for resetting a cathode of the photoelectric conversion element to initial voltage, an amplifying transistor for converting electric charges accumulated in the photoelectric conversion element to voltage, and a row selection transistor for selecting signals output from pixel areas arranged in a row direction. A voltage control circuit controls the potential of a gate of the reset transistor during a period when the photoelectric conversion element is reset to change ON-state resistance of the reset transistor. By doing so, a cutoff frequency for a low-pass filter formed in the pixel circuit by ON-state resistance of the reset transistor and parasitic capacitance produced at the cathode on the photoelectric conversion element will be controlled.

12 Claims, 9 Drawing Sheets

CMOS IMAGE SENSOR WITH VOLTAGE CONTROL CIRCUIT

CROSS-REFERENCE TO RELATED APPLICATIONS

This application is based upon and claims priority of Japanese Patent Application No. 2002-29633, filed on Feb. 6, 2002, the contents being incorporated herein by reference.

BACKGROUND OF THE INVENTION (1) Field of the Invention

This invention relates to a CMOS image sensor for getting images by outputting in order image signals sensed in each of pixel areas arranged like a matrix on the basis of X-Y addressing and, more particularly, to a CMOS image sensor which can reduce kTC noise.

(2) Description of the Related Art

With the spread of digital still-image cameras and digital video cameras, the addition of a camera function to cellular telephones, and the like, a demand for solid imaging devices has risen in recent years. At present charge coupled devices (CCDs) have spread most widely as solid imaging devices. However, these CCDs have the drawbacks of the need for a plurality of power supply circuits, a high driving voltage, and high power consumption. Therefore, attention has recently been riveted to CMOS image sensors that can be produced by the process for producing complementary metal-oxide semiconductors (CMOSes), which can operate at a low voltage, which consume only a small amount of power, and the unit cost of the production of which is low.

In CMOS image sensors, pixel circuits each of which gets an image corresponding to one pixel are arranged like a matrix. They output image signals corresponding to an entire image by selecting in order output from each pixel circuit with a vertical scanning shift register and horizontal scanning shift register.

Figure 9:
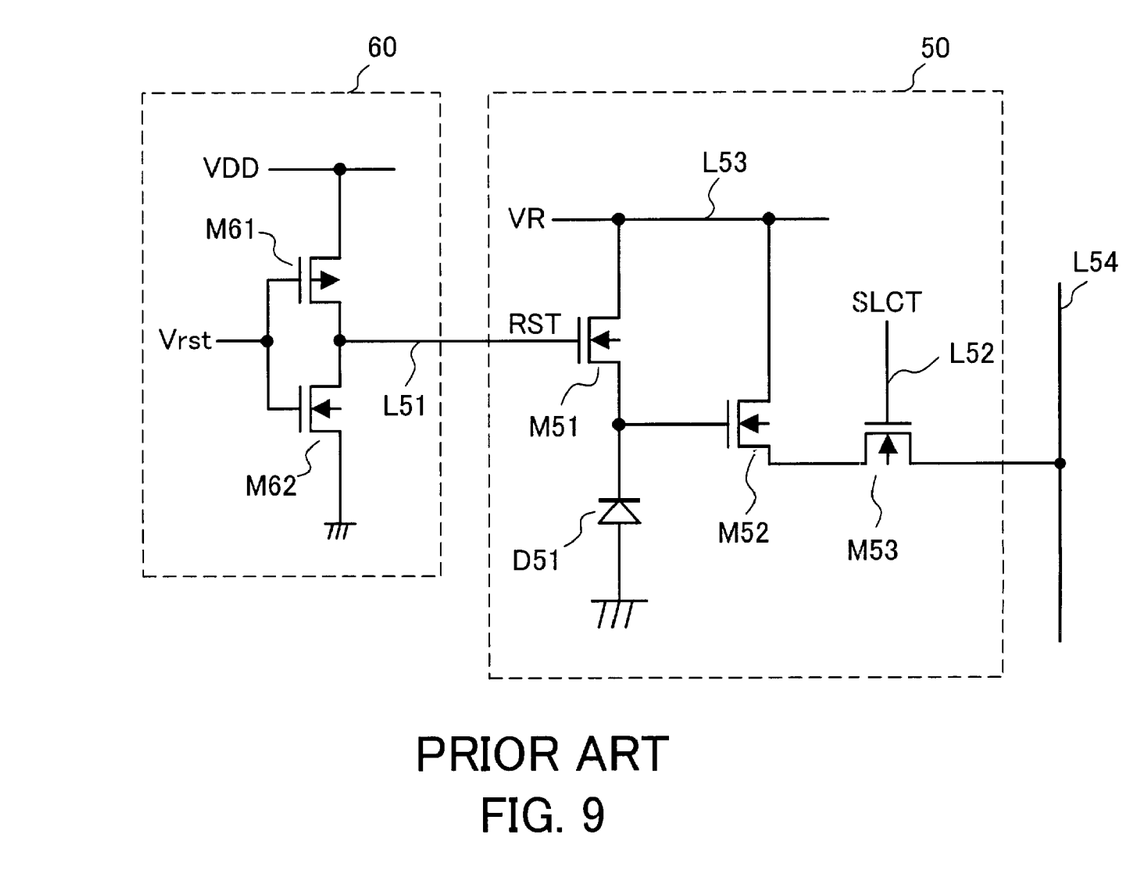
FIG. 9 is a view showing an example of the structure of a pixel circuit and a circuit around it in a conventional CMOS image sensor.

FIG. 9 is a view showing an example of the structure of a pixel circuit and a circuit around it in a conventional CMOS image sensor.

A pixel circuit 50 shown in FIG. 9 includes a photoelectric conversion element D51, being a photodiode, a photogate, or the like, and has an active pixel sensor (APS) structure in which a reset transistor M51, amplifying transistor M52, and row selection transistor M53 each formed by, for example, an n-channel MOS field-effect transistor (MOSFET) are located. Moreover, an inverter circuit 60 including a p-channel MOS transistor (pMOS transistor) M61 and n-channel MOS transistor (nMOS transistor) M62 is connected to a gate of the reset transistor M51.

The anode side of the photoelectric conversion element D51 is grounded and the cathode side is connected to a source of the reset transistor M51 and a gate of the amplifying transistor M52. A drain of the reset transistor M51 and a drain of the amplifying transistor M52 are connected to a power supply line L53 where reset voltage VR is supplied. A gate of the reset transistor M51 is connected via a reset signal line L51 to an output electrode on the inverter circuit 60 and is supplied with a reset signal RST.

A source of the amplifying transistor M52 is connected to a drain of the row selection transistor M53. A gate of the row selection transistor M53 is connected to a row selection signal line L52 where a row selection signal SLCT for selecting the pixel circuits 50 in a row direction is supplied. A source of the row selection transistor M53 is connected to a column selection signal line L54 for selecting the pixel circuits 50 in a column direction.

In the inverter circuit 60, power supply voltage VDD is supplied to a source of the pMOS transistor M61 and a source of the nMOS transistor M62 is grounded. A reset control signal Vrst is input to gate of the pMOS transistor M61 and nMOS transistor M62. Drain of the pMOS transistor M61 and nMOS transistor M62 are connected to the reset signal line L51 and output a reset signal RST.

Now, operation in the conventional pixel circuit 50 will be described in brief.

When a low-level reset control signal Vrst is input to the inverter circuit 60, the pMOS transistor M61 goes into an ON state, the nMOS transistor M62 goes into an OFF state, and a high-level reset signal RST is input to the gate of the reset transistor M51. As a result, the reset transistor M51 goes into an ON state and the photoelectric conversion element D51 is charged by reset voltage VR.

Next, when the reset control signal Vrst goes into a high-level state, the reset signal RST goes into a low-level state. When light strikes it in this state of things, the photoelectric conversion element D51 begins to discharge and its potential drops from the reset voltage VR. The amplifying transistor M52 functions as a source follower amplifier and amplifies the voltage of the cathode of the photoelectric conversion element D51. After a predetermined period of time elapsed, a row selection signal SLCT is input to the gate of the row selection transistor M53. When the row selection transistor M53 goes into an ON state, the voltage of the source of the amplifying transistor M52 is gotten via the column selection signal line L54 as signal voltage.

The column selection signal line L54 is connected via an amplifier/noise cancel circuit (not shown) to, for example, a drain of a column selection transistor (not shown). In a CMOS image sensor, each of the pixel circuits 50 arranged in a horizontal direction is selected by a row selection signal SLCT, the column selection transistors each connected to the column selection signal line L54 are put in order into an ON state, and image signals corresponding to one pixel are output in order.

With the pixel circuits 50 having the above structure, however, kTC noise produced at the time of the photoelectric conversion element D51 being reset will degrade the S/N ratio of an output image signal. When the reset transistor M51 is in the ON state and the photoelectric conversion element D51 has been reset to the initial potential, kTC noise will be produced. This kTC noise is random thermal noise and is expressed by $vkTC=(kT/C)^{1/2}$ where k is the Boltzmann's constant, T is absolute temperature, and C is the total capacitance of the photoelectric conversion element D51.

This kTC noise is produced at random, so it is comparatively difficult to remove the kTC noise from image signals. There are many cases where high-frequency kTC noise cannot be removed.

For example, it has been suggested that kTC noise should be reduced by keeping the voltage of the cathode of the photoelectric conversion element D51 at reset time constant by the use of a differential amplifier. This method can reduce kTC noise components in a frequency band where this differential amplifier operates, but it cannot reduce kTC noise components at frequencies higher than that frequency band.

Moreover, there are many cases where a circuit for reducing kTC noise is comparatively large-scale. If such a circuit is used and component elements and wirings are formed in pixel areas, a fill factor for a light receiving section will lower.

SUMMARY OF THE INVENTION

The present invention was made under the background circumstances as described above. An object of the present invention is to provide a CMOS image sensor which can reduce wideband kTC noise.

In order to achieve the above object, a CMOS image sensor for getting images by outputting in order image signals sensed in each of pixel areas arranged like a matrix on the basis of X-Y addressing is provided. This CMOS image sensor comprises pixel circuits each including a photoelectric conversion element for carrying out the photoelectric conversion of incident light, a reset transistor for resetting a cathode of the photoelectric conversion element to initial voltage, an amplifying transistor for converting electric charges accumulated in the photoelectric conversion element to voltage, and a row selection transistor for outputting voltage output from the amplifying transistor as image signals corresponding to one pixel on the basis of a row selection signal to select signals output from the pixel areas arranged in a row direction and a voltage control circuit for controlling a cutoff frequency for a low-pass filter formed by ON-state resistance of the reset transistor and parasitic capacitance produced at the cathode of the photoelectric conversion element during a period when the photoelectric conversion element is reset by controlling the potential of a gate of the reset transistor.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Embodiments of the present invention will now be described with reference to the drawings.

Figure 2:
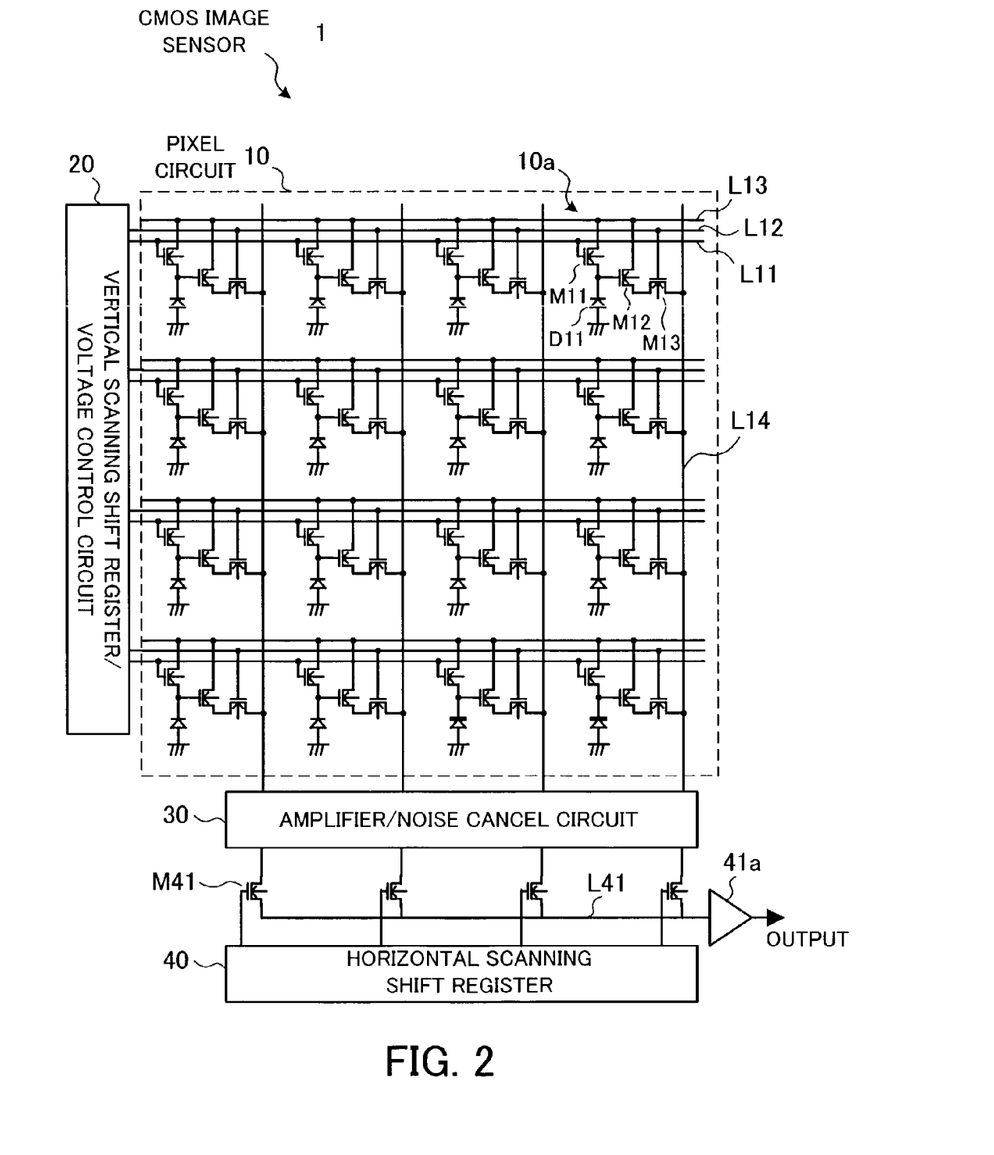
FIG. 2 is a view showing the entire structure of a CMOS image sensor according to the present invention.

FIG. 2 is a view showing the entire structure of a CMOS image sensor according to the present invention.

As shown in FIG. 2, a CMOS image sensor 1 according to the present invention comprises a pixel section 10 where pixel circuits 10a are arranged like a matrix, a vertical scanning shift register/voltage control circuit 20 for specifying the pixel circuits 10a in a vertical direction and for controlling the voltage of a reset signal, an amplifier/noise cancel circuit 30 for performing the processes of amplifying image signals output from the pixel circuits 10a in each column and reducing noise included in them, and a horizontal scanning shift register 40 for specifying output from the pixel circuits 10a in a horizontal direction by column selection transistors M41. Moreover, an amplifier 41a is connected to an output bus L41 which accepts a signal output from each column selection transistor M41.

The amplifier/noise cancel circuit 30 in FIG. 2 is shown as one functional block, but in reality there is one amplifier/noise cancel circuit 30 for each column of the pixel circuits 10a arranged. The pixel circuits 10a are arranged in four rows and four columns in the pixel section 10 in FIG. 2, but in reality more pixel circuits 10a will be arranged there.

Each pixel circuit 10a includes a photoelectric conversion element D11, being a photodiode, a photo-gate, or the like, and has an active pixel sensor (APS) structure in which a reset transistor M11, amplifying transistor M12, and row selection transistor M13 each formed by, for example, an n-channel MOSFET are located.

The anode side of the photoelectric conversion element D11 is grounded and the cathode side is connected to a source of the reset transistor M11 and a gate of the amplifying transistor M12. A source of the amplifying transistor M12 is connected to a drain of the row selection transistor M13.

Reset signal lines L11 for resetting the photoelectric conversion element D11 and row selection signal lines L12 for selecting the pixel circuits 10a in a row direction extend parallel to each row from the vertical scanning shift register/voltage control circuit 20. The reset signal line L11 is connected to a gate of the reset transistor M11 to supply a reset signal. The row selection signal line L12 is connected to a gate of the row selection transistor M13 to supply a row selection signal. A drain of the reset transistor M11 and a drain of the amplifying transistor M12 are connected to a reset voltage supply line L13.

A source of the row selection transistor M13 is connected to a column selection signal line L14 for selecting the pixel circuits 10a in a column direction. The column selection signal line L14 in each column is connected via the amplifier/noise cancel circuit 30 to a drain of the column selection transistor M41.

A source of each column selection transistor M41 is connected to the output bus L41. Column selection signals are input in order from the horizontal scanning shift register 40 to a gate of each column selection transistor M41 with predetermined timing. As a result, image signals on which an amplification process and noise reduction process were performed in the amplifier/noise cancel circuit 30 are output in order to the output bus L41 and are sent via the amplifier 41a to an external system.

Figure 1:
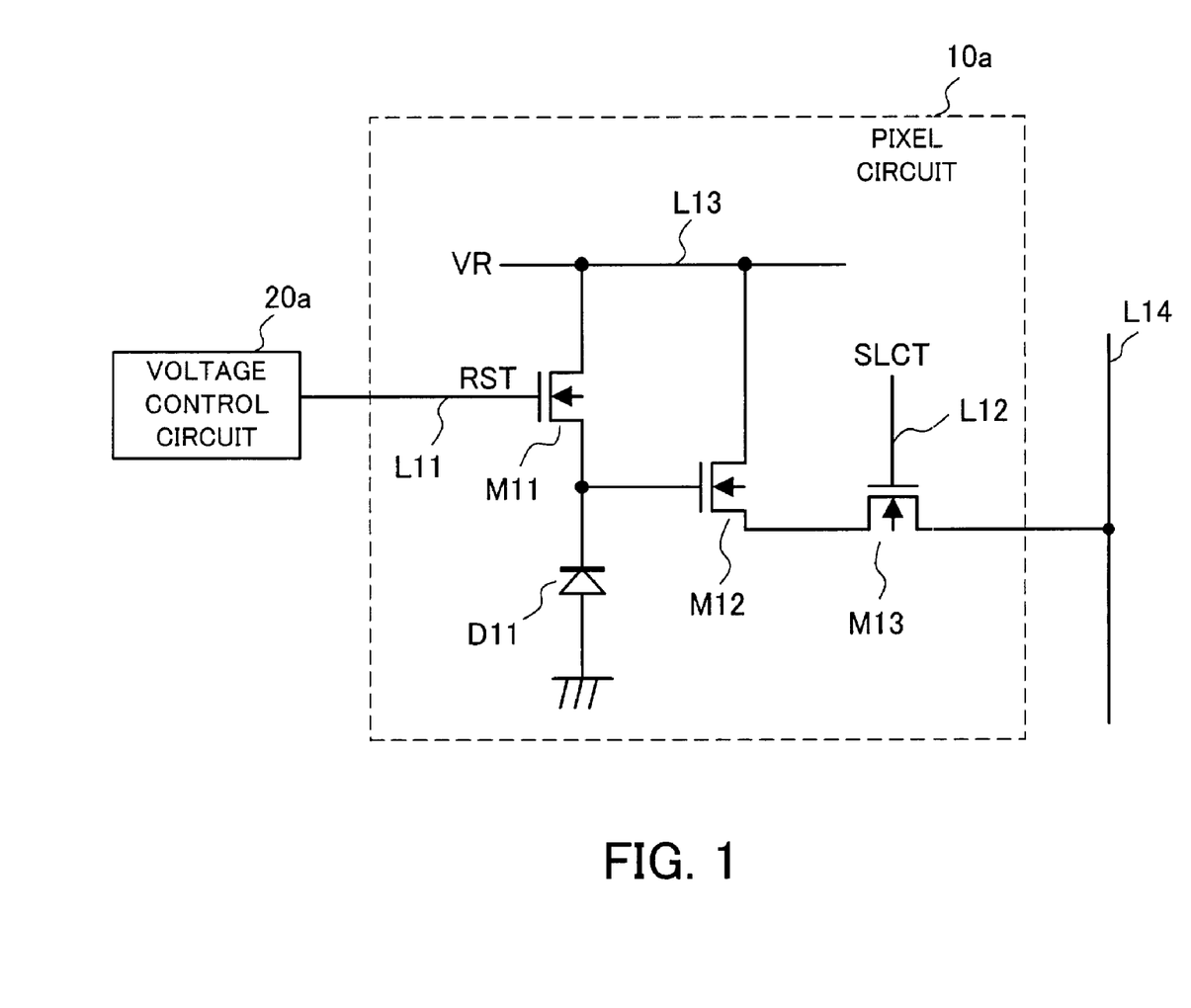
FIG. 1 is an enlarged view showing one of pixel circuits included in a CMOS image sensor according to the present invention.

FIG. 1 is an enlarged view showing one pixel circuit 10a. Not only the pixel circuit 10a but also a voltage control circuit 20a for supplying a reset signal RST to the gate of the reset transistor M11 are shown in FIG. 1.

Now, the basic operation of the pixel circuit 10a will be described by the use of FIG. 1.

First, when a reset signal RST is supplied via the reset signal line L11 from the voltage control circuit 20a and the reset transistor M11 goes into an ON state with predetermined timing, the photoelectric conversion element D11 is charged to reset potential VR as initial voltage. Next, when the reset signal RST is put into the OFF state, electric charges are accumulated in the photoelectric conversion element D11 according to incident light from the outside. With the accumulation of electric charges, potential on the cathode side of the photoelectric conversion element D11 drops. The amplifying transistor M12 functions as a source follower amplifier and amplifies potential on the cathode side of the photoelectric conversion element D11.

The accumulation of signal charges is begun in this way. After a predetermined period of time elapsed, a row selection signal SLCT is input from the row selection signal line L12 to the gate of the row selection transistor M13. Then voltage output from the amplifying transistor M12 is output to the column selection signal line L14 as an image signal. And then the reset transistor M11 goes into the ON state due to a reset signal RST input and signal charges accumulated in the photoelectric conversion element D11 are reset.

With the pixel circuit 10a having the above structure, kTC noise will be produced while a reset signal RST is inputting. This kTC noise component is added to signal voltage according to electric charges accumulated in the photoelectric conversion element D11. kTC noise is random thermal noise and is expressed by $vkTC=(kT/C)^{1/2}$ where k is the Boltzmann's constant, T is absolute temperature, and C is the total capacitance of the photoelectric conversion element D11.

With the CMOS image sensor 1 according to the present invention, the voltage of a reset signal RST supplied to the gate of the reset transistor M11 is controlled by the voltage control circuit 20a to reduce the high-frequency components of this kTC noise. As a result of controlling the voltage of a reset signal RST, ON-state resistance of the reset transistor M11 will change. In the pixel circuit 10a, ON-state resistance of the reset transistor M11 and parasitic capacitance produced at the cathode of the photoelectric conversion element D11 form a low-pass filter for signal voltage. A cutoff frequency for this low-pass filter therefore can be controlled by changing ON-state resistance at the time of a reset of the reset transistor M11. As a result, kTC noise components at frequencies higher than and equal to an arbitrary one can be reduced by controlling the voltage of a reset signal RST.

Figure 3:
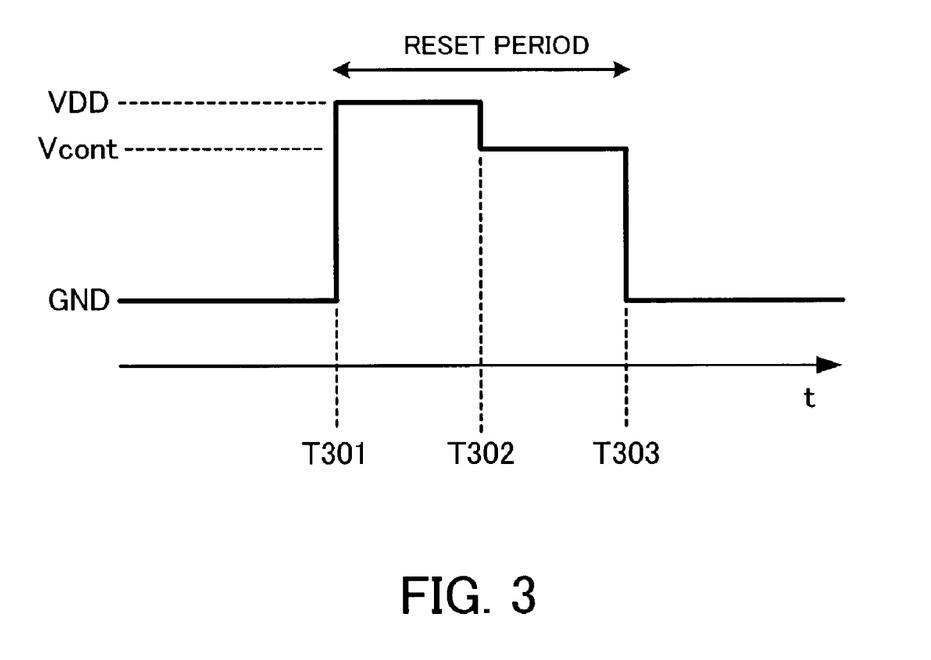
FIG. 3 is a view showing an example of the pulse shape of a reset signal output from a voltage control circuit.

FIG. 3 is a view showing an example of the pulse shape of a reset signal RST output from the voltage control circuit 20a.

In FIG. 3, the voltage control circuit 20a outputs a reset signal RST to the gate of the reset transistor M11 from timing T301 to timing T303. Therefore, this is a reset period when the reset transistor M11 is in an ON state and when electric charges accumulated in the photoelectric conversion element D11 are reset.

The voltage control circuit 20a divides this reset period in two to control the voltage of a reset signal. The voltage control circuit 20a outputs power supply voltage VDD first at the timing T301. This puts the reset transistor M11 into the ON state. In this case, ON-state resistance of the reset transistor M11 is minimized by the power supply voltage VDD to reliably reset electric charges accumulated in the photoelectric conversion element D11.

After a predetermined period of time elapsed, the voltage control circuit 20a outputs control voltage Vcont at timing T302 to control a cutoff frequency for the above low-pass filter. This control voltage Vcont is higher than or equal to the threshold voltage of the reset transistor M11. As shown in FIG. 3, this control voltage Vcont is usually lower than the power supply voltage VDD. When the potential of the gate of the reset transistor M11 drops in this way, ON-state resistance of the reset transistor M11 increases and a cutoff frequency for the low-pass filter becomes low. As a result, a cutoff frequency for the low-pass filter can be set freely by changing control voltage Vcont and kTC noise components at frequencies higher than and equal to the cutoff frequency are reduced during this period.

Then the voltage control circuit 20a stops outputting the control voltage Vcont at the timing T303. As a result, output voltage changes from the control voltage Vcont to GND potential and integration in the photoelectric conversion element D11 is begun.

As described above, by setting the voltage of a reset signal RST to control voltage Vcont, the lower limit of a frequency band where kTC noise can be reduced can be set freely. Moreover, by outputting power supply voltage VDD before outputting the control voltage Vcont, the photoelectric conversion element D11 can be reset reliably.

Figure 4:
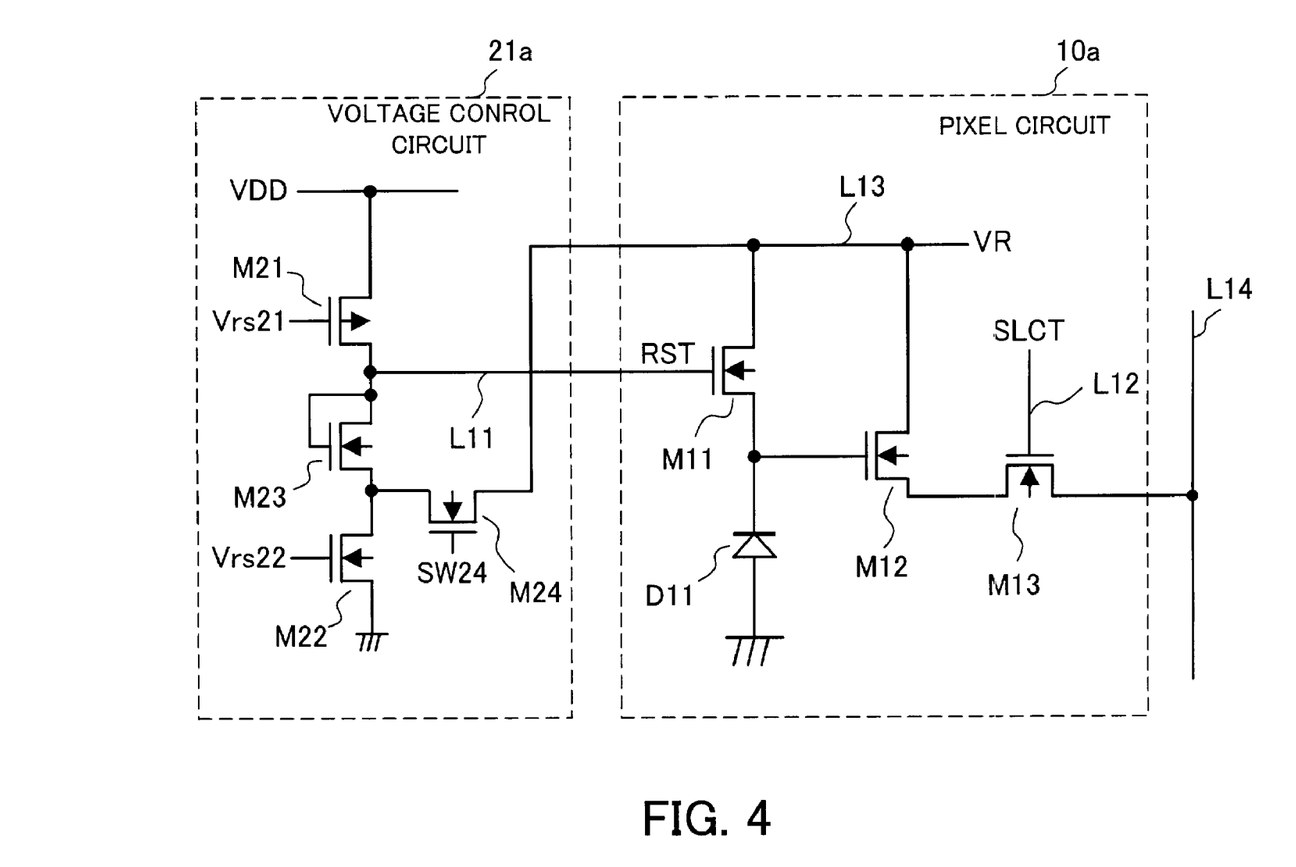
FIG. 4 is a view showing a first example of the structure of a voltage control circuit applicable to the present invention.

Now, a concrete example of the structure of the voltage control circuit 20a will be described. FIG. 4 is a view showing a first example of the structure of the voltage control circuit 20a. In FIG. 4, the structure of the above pixel circuit 10a is also shown for reference.

A voltage control circuit 21a shown in FIG. 4 comprises a CMOS inverter circuit including a p-channel MOS transistor (pMOS transistor) M21 and n-channel MOS transistor (nMOS transistor) M22, a blooming control transistor M23 inserted between the pMOS transistor M21 and nMOS transistor M22, and a circuit connection transistor M24 for adjusting connection to the reset voltage supply line L13. In this example, n-channel MOS transistors are used as the blooming control transistor M23 and circuit connection transistor M24, but p-channel MOS transistors may be used instead of n-channel MOS transistors.

Power supply voltage VDD is supplied to a source of the pMOS transistor M21 and a source electrode on the nMOS transistor M22 is grounded. Reset control signals Vrs21 and Vrs22 are input to gate electrodes on the pMOS transistor M21 and nMOS transistor M22 respectively. A drain of the blooming control transistor M23 is connected to a drain of the pMOS transistor M21 and the reset signal line L11. A source of the blooming control transistor M23 is connected to a drain of the nMOS transistor M22. A gate and drain of the blooming control transistor M23 are connected directly to each other.

A drain of the circuit connection transistor M24 is connected to the reset voltage supply line L13 and its source is connected to the point where the nMOS transistor M22 and blooming control transistor M23 connect. A circuit connection signal SW24 is input to a gate of the circuit connection transistor M24.

Now, the operation of the voltage control circuit 21a will be described by associating it with operation in the pixel circuit 10a.

First, when a reset control signal Vrs21, reset control signal Vrs22, and circuit connection signal SW24 go into a low-level state, the pMOS transistor M21 goes into an ON state and power supply voltage VDD is output as a reset signal RST. As a result, a reset period begins and the cathode side of the photoelectric conversion element D11 is reset by reset voltage VR.

When both the reset control signal Vrs21 and circuit connection signal SW24 go into a high-level state after a predetermined period of time, the pMOS transistor M21 goes into the OFF state and the circuit connection transistor M24 goes into the ON state. This is a state in which control voltage Vcont is output as the reset signal RST. That is to say, the threshold voltage Vth of the blooming control transistor M23 is output with the reset voltage VR as a reference. As a result, ON-state resistance of the reset transistor M11 increases and a cutoff frequency for a low-pass filter formed by the reset transistor M11 and photoelectric conversion element D11 will be set.

After a predetermined period of time elapsed, the reset control signal Vrs22 and circuit connection signal SW24 go into a high-level state and low-level state respectively and the nMOS transistor M22 and circuit connection transistor M24 go into the ON state and OFF state respectively. The reset period ends at this point in time. At this time the potential of a node for a reset signal RST is about the threshold voltage Vth of the blooming control transistor M23 with GND potential as a reference and the reset transistor M11 does not completely go into the OFF state. Therefore, if a strong light strikes the photoelectric conversion element D11, surplus electric charges produced can flow through the reset transistor M11 and to the reset voltage supply line L13. This prevents a blooming phenomenon.

During a period when a blooming phenomenon is prevented, constant current may be supplied to the gate of the reset transistor M11 by the use of power supply voltage VDD to reliably clamp a node for a reset signal RST by the threshold voltage Vth of the blooming control transistor M23.

In the voltage control circuit 21a shown in FIG. 4, control voltage Vcont for setting a cutoff frequency for the low-pass filter is determined according to the threshold voltage Vth of the blooming control transistor M23. The blooming control transistor M23 should be selected according to the ratio of the threshold voltage of the reset transistor M11 to the threshold voltage of the blooming control transistor M23 so that a desired cutoff frequency can be obtained. By doing so, an error which occurs due to process variation between the reset transistor M11 and the blooming control transistor M23 when control is exercised over ON-state resistance of the reset transistor M11 will decrease and a cutoff frequency can be approximated more reliably to a set value.

There are many cases where the threshold voltage Vth of the blooming control transistor M23 selected is, for example, ten times higher than that of the reset transistor M11.

With the above voltage control circuit 21a, the potential of a reset signal RST can be set reliably to desired control voltage Vcont during a reset period and a blooming phenomenon can be prevented during a period when the photoelectric conversion element D11 integrates.

Now, the structure of a circuit being able to reduce kTC noise in all frequency bands by adding a differential amplifier which uses a part of the elements included in the pixel circuit 10a to the above structure will be described. Except for components in the pixel circuit 10a, this differential amplifier is formed in the amplifier/noise cancel circuit 30.

Figure 5:
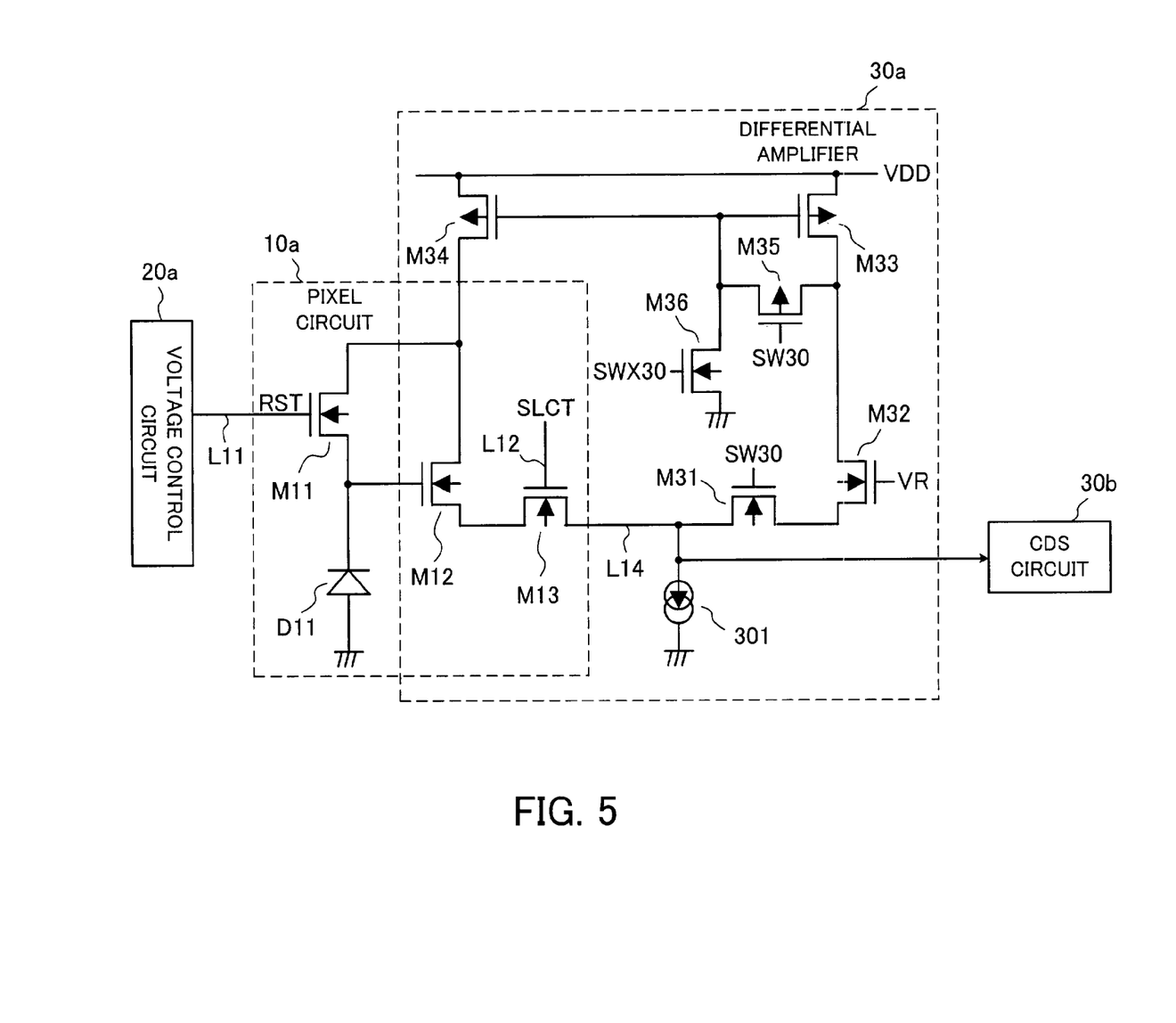
FIG. 5 is a view showing an example of the circuit structure of a differential amplifier applicable to the present invention.

FIG. 5 is a view showing an example of the circuit structure of a differential amplifier applicable to the present invention. Components in FIG. 5 corresponding to those in the CMOS image sensor 1 shown in FIGS. 1, 2, and 4 are marked with the same symbols and descriptions of them will be omitted.

Of elements included in a differential amplifier 30a shown in FIG. 5, elements other than the ones formed in the pixel circuit 10a are formed in the amplifier/noise cancel circuit 30 in each column. In FIG. 5, only one of the pixel circuits 10a arranged in a column direction is shown for the sake of simplicity.

As shown in FIG. 5, the differential amplifier 30a for reducing kTC noise includes an amplifying transistor M12 and row selection transistor M13 in the pixel circuit 10a as part of its components. A source of the row selection transistor M13 is connected via a column selection signal line L14 to a source of a circuit switching transistor M31 having almost the same characteristics as the row selection transistor M13. A circuit switching signal SW30 is input to a gate of the circuit switching transistor M31.

The point where the row selection transistor M13 and circuit switching transistor M31 connect is connected to a constant current source 301 and is a terminal for outputting to the outside.

A drain of the circuit switching transistor M31 is connected to a source of a first differential transistor M32 having almost the same characteristics as the amplifying transistor M12. Reset voltage VR is applied to a gate of the first differential transistor M32 in synchronization with an input reset signal RST. A drain of the first differential transistor M32 is connected to a drain of a transistor M33 of, for example, a p-channel MOS type. Power supply voltage VDD is applied to a source of the transistor M33.

On the other hand, drain electrodes on the reset transistor M11 and amplifying transistor M12 in the pixel circuit 10a are connected to a drain of a transistor M34 of, for example, a p-channel MOS type. The power supply voltage VDD is applied to a source of the transistor M34. Wirings which connect the drain of the reset transistor M11 and amplifying transistor M12 and the transistor M34 are formed along the column selection signal line L14 outside an area where the pixel circuit 10a is formed.

A gate of the transistor M33 and a gate of the transistor M34 are connected directly to each other. A circuit switching transistor M35 is located between the point where the first differential transistor M32 and transistor M33 connect and the gate of the transistors M33 and M34 connected directly to each other. The circuit switching signal SW30 is input to a gate of the circuit switching transistor M35. Moreover, the gate of the transistors M33 and M34 are connected to a drain of a circuit switching transistor M36. A source of the circuit switching transistor M36 is grounded and a circuit switching signal SWX30 the polarity of which is reverse to that of the above circuit switching signal SW30 is input to a gate of the circuit switching transistor M36.

If the differential amplifier 30a has the above structure, the transistors M33 and M34 the gate of which are connected directly to each other form a current mirror circuit by putting the row selection transistor M13 and circuit switching transistor M35 into an ON state and by putting the circuit switching transistor M36 into an OFF state. Therefore, when all of the row selection transistor M13 and circuit switching transistors M31 and M35 are put into the ON state and the circuit switching transistor M36 is put into the OFF state, the differential amplifier 30a having the current mirror circuit as a load resistor will operate by considering the amplifying transistor M12 in the pixel circuit 10a as a second differential transistor being the pair to the first differential transistor M32.

Moreover, a correlated double sampling (CDS) circuit 30*b* for removing noise which will occur at the time of a reset signal being put into the OFF state is located on the output side of the above differential amplifier 30*a*. The internal structure of the CDS circuit 30*b* will be described later in FIG. 6.

Now, the operation of reducing kTC noise by the use of the above differential amplifier 30*a* will be described.

When a period for resetting the photoelectric conversion element D11 ends and an input reset signal RST is in an inactive state, the circuit switching transistors M31 and M35 go into the OFF state and the circuit switching transistor M36 goes into the ON state. As a result, the main portion of the differential amplifier 30*a* is separated electrically from the elements in the pixel circuit 10*a* and the differential amplifier 30*a* goes into an inactive state. At this time the operation of accumulating signals according to incident light will be performed in the photoelectric conversion element D11.

After a predetermined period of time elapsed, the circuit switching transistor M36 is put into an OFF state and the circuit switching transistors M31 and M35 are put into an ON state. At this time the row selection transistor M13 also goes into the ON state. As a result, the differential amplifier 30*a* will begin to operate. In this state of things, a reset signal RST is input to the gate of the reset transistor M11 and reset voltage VR is applied to the gate of the first differential transistor M32.

While the reset signal RST is in the ON state, the differential amplifier 30*a* controls voltage output from the transistor 34 on the output side of the current mirror circuit to keep potential on the cathode side of the photoelectric conversion element D11 at the reset voltage VR. As stated above, the differential amplifier 30*a* operates as an operational amplifier with an amplification factor of 1 during a reset period. The differential amplifier 30*a* always reduces kTC noise which will occur during a reset period to a constant level by this operation.

In the above circuit structure of the differential amplifier 30*a*, the main portion of the circuit is located outside the area where the pixel circuit 10*a* is formed. When the differential amplifier 30*a* operates, elements in the pixel circuit 10*a* constitute a part of its circuit structure. Therefore, kTC noise can be reduced without lowering a fill factor for a light receiving section.

By the way, the differential amplifier 30*a* operates only in a limited frequency band and cannot reduce the high frequency components of kTC noise. Therefore, the voltage control circuit 20*a* controls the voltage of a reset signal RST so that a low-pass filter formed in the pixel circuit 10*a* by ON-state resistance of the reset transistor M11 and the parasitic capacitance of the photoelectric conversion element D11 will function. By doing so, the high frequency components of kTC noise will be reduced. In this case, the voltage control circuit 20*a* controls the voltage of a reset signal RST so that a cutoff frequency for the low-pass filter will not exceed the upper limit of a frequency band where the differential amplifier 30*a* operates. This can reduce kTC noise which occurs in a wide frequency band.

Moreover, by locating the CDS circuit 30*b* on the output side of the differential amplifier 30*a*, reset noise which will occur in the reset transistor M11 at the time of a reset signal RST being put into the OFF state can be removed. The level of this reset noise differs among different pixel circuits 10*a* due to variation in the threshold voltage of the reset transistors M11. Therefore, the CDS circuit 30*b* first samples image signals including reset noise from the pixel circuit 10*a* and then samples again voltage output at reset time. By obtaining differential signals from the samples, reset noise will be removed.

Figure 6:
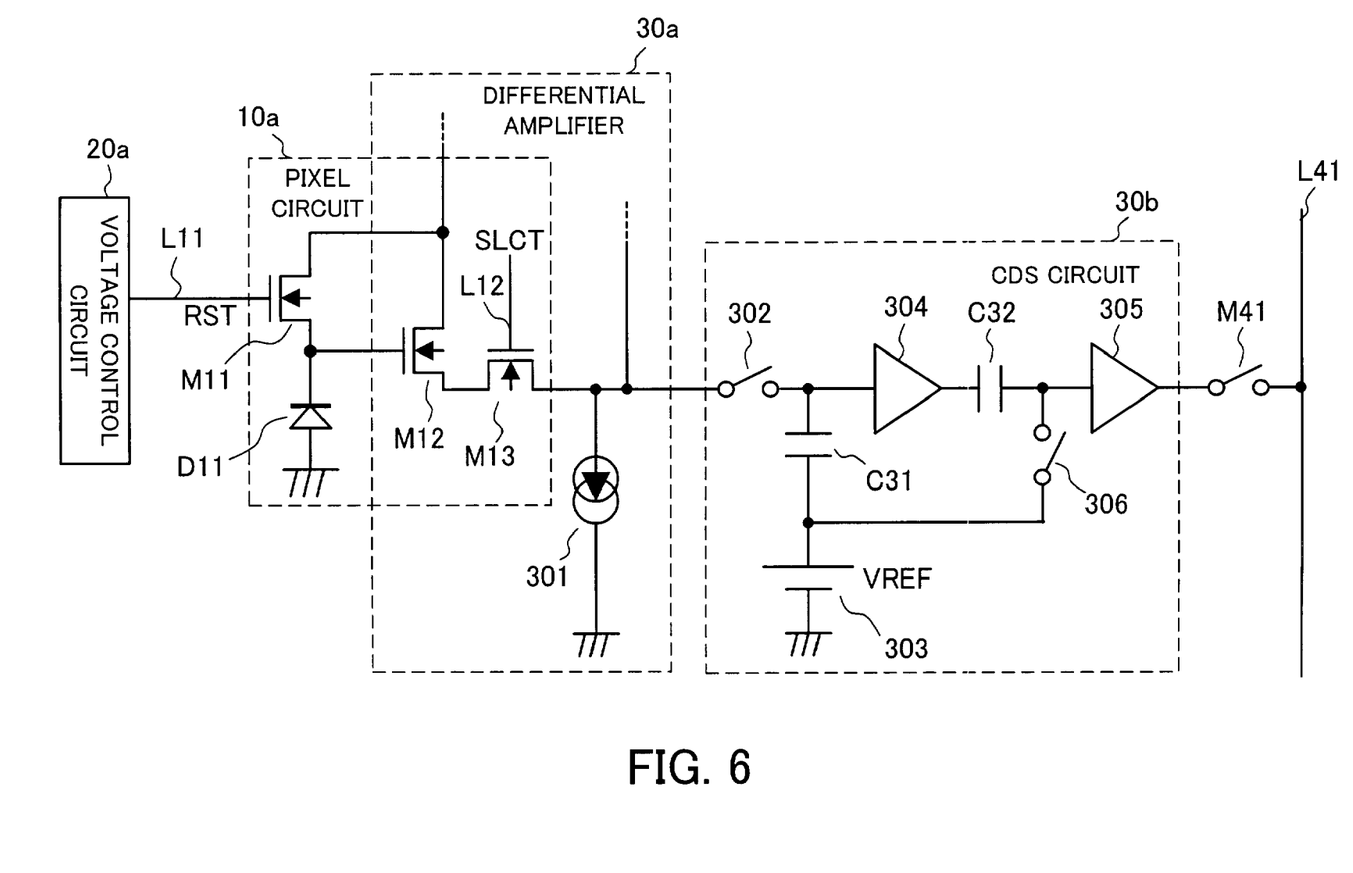
FIG. 6 is a view showing an example of the structure of a CDS circuit applicable to the present invention.

FIG. 6 is a view showing an example of the structure of the CDS circuit 30*b* applicable to the present invention.

In this example, the structure of the pixel circuit 10*a* corresponding to one pixel, part of the differential amplifier 30*a* in a column, and the CDS circuit 30*b* corresponding to the differential amplifier 30*a* in a column is shown.

As shown in FIG. 6, a sample and hold switch 302 for controlling input of image signals output from the differential amplifier 30*a* is located in the CDS circuit 30*b*. A sample and hold capacitor C31 for holding a signal is connected to the output side of the sample and hold switch 302. A reference voltage source 303 for supplying reference voltage VREF is connected to the other side of the sample and hold capacitor C31.

The point where the sample and hold switch 302 and the sample and hold capacitor C31 connect is connected to an input terminal of an amplifier 304. A CDS capacitor C32 is connected to an output terminal of the amplifier 304 and the other side of the CDS capacitor C32 is connected to an input terminal of an amplifier 305.

The point where the sample and hold capacitor C31 and the reference voltage source 303 connect is connected via a clamping switch 306 to the point where the CDS capacitor C32 and the amplifier 305 connect. By turning the clamping switch 306 to ON or OFF, the potential of a terminal on the amplifier 305 side of the CDS capacitor C32 can be fixed at reference voltage VREF supplied from the reference voltage source 303 or be separated from the reference voltage VREF. An output terminal of the amplifier 305 is connected via the column selection transistor M41 to the output bus L41.

Now, the operation of the CDS circuit 30*b* will be described by associating it with operation in the pixel circuit 10*a* and differential amplifier 30*a*.

First, when the row selection transistor M13 and circuit switching transistors M31 and M35 in the differential amplifier 30*a* are put into an ON state and the circuit switching transistor M36 in the differential amplifier 30*a* is put into an OFF state, the differential amplifier 30*a* begins the operation of reducing kTC noise. In concurrence with or after that, the reset transistor M11 is put into the ON state with the row selection transistor M13 kept in the ON state. As a result, the photoelectric conversion element D11 is reset to reset voltage VR and the reset voltage VR is output to the column selection signal line L14. The above operation will be performed in a horizontal blanking period.

Next, when the reset period ends, the differential amplifier 30*a* and pixel circuit 10*a* are separated electrically and the photoelectric conversion element D11 begins integration. At this time variations in the voltage of the amplifying transistor M12 corresponding to the amount of electric charge accumulated by the photoelectric conversion element D11 are output to the column selection signal line L14 as the voltage of image signals.

Then the clamping switch 306 and the sample and hold switch 302 are put into the ON state. As a result, the voltage of the image signals is applied to the point where the sample and hold capacitor C31 and the amplifier 304 connect, and image signals corresponding to integration time are accumulated in both of the sample and hold capacitor C31 and CDS capacitor C32 as electric charge. The signals accumulated at this time include reset noise components. After a certain period of time elapsed, the clamping switch 306 and the sample and hold switch 302 are put into the OFF state to hold sampled image signals.

To accumulate only reset noise components in the sample and hold capacitor C31, the operation of the differential amplifier 30a is begun again. In concurrence with or directly after that, the reset transistor M11 is put into the ON state again. As a result, the photoelectric conversion element D11 is reset to reset voltage VR and the reset voltage VR is output to the column selection signal line L14. In this case, the sample and hold switch 302 is turned to ON, then a reset signal RST is put into the OFF state, and then the sample and hold switch 302 is also turned to OFF after a predetermined period of time.

As a result of this operation, voltage, being the difference between reference voltage VREF and an image signal from which only reset noise components were removed, will be produced at the point where the CDS capacitor C32 and the amplifier 305 connect. Therefore, then the image signal from which reset noise components were removed will be sent to the output bus L41 by putting the column selection transistor M41 into the ON state and turning the clamping switch 306 to ON in synchronization with a column selection signal from the horizontal scanning shift register 40.

Figure 7:
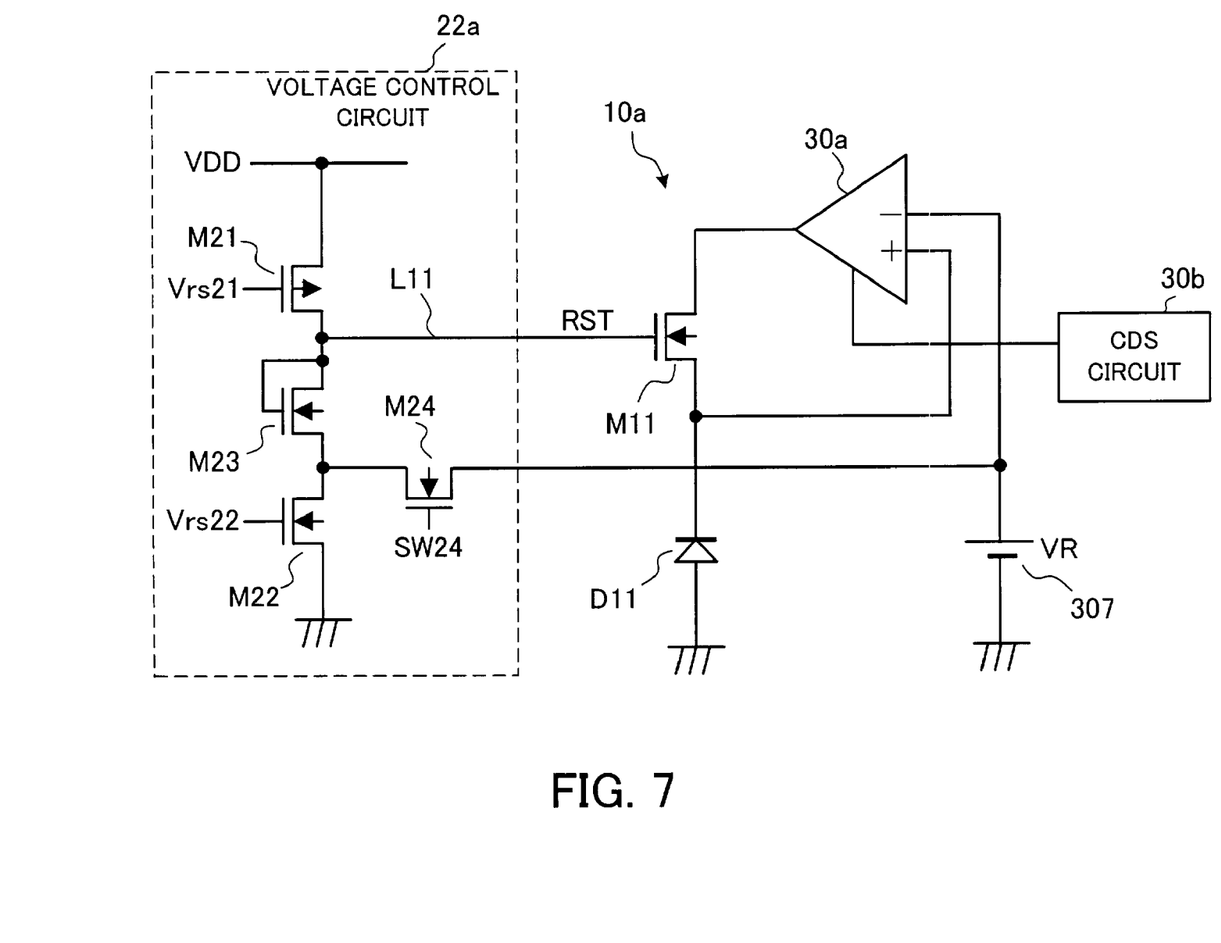
FIG. 7 is a view showing a second example of the structure of a voltage control circuit applicable to the present invention.

Now, an example of the structure of the voltage control circuit 20a applicable to a CMOS image sensor circuit in the case of the above differential amplifier 30a being located will be described. FIG. 7 is a view showing a second example of the structure of the voltage control circuit 20a applicable to the present invention.

For the sake of simplicity FIG. 7 shows the differential amplifier 30a as a block. The details of its circuit structure are omitted. Components in FIG. 7 corresponding to those in FIG. 4 are marked with the same symbols and descriptions of them will be omitted. Moreover, it is assumed that reset voltage VR is applied to a gate of a first differential transistor M32 in the differential amplifier 30a from a reset voltage source 307.

The circuit structure of a voltage control circuit 22a shown in FIG. 7 is basically the same as that of the voltage control circuit 21a shown in FIG. 4 as an example of cases where the differential amplifier 30a is not located. That is to say, the voltage control circuit 22a shown in FIG. 7 has a structure where a blooming control transistor M23 is inserted between a pMOS transistor M21 and nMOS transistor M22 which form a CMOS inverter circuit. A reset signal line L11 for outputting a reset signal RST is connected to a drain and gate of the blooming control transistor M23 connected directly to each other.

A circuit connection transistor M24 is located between the point where the nMOS transistor M22 and the blooming control transistor M23 connect and the output side of the reset voltage source 307. The circuit connection transistor M24 will adjust connection between them according to a circuit connection signal SW24 input.

The voltage control circuit 22a operates the same as the voltage control circuit 21a shown in FIG. 4. First, when a reset control signal Vrs21, reset control signal Vrs22, and circuit connection signal SW24 go into a low-level state, the pMOS transistor M21 goes into the ON state and power supply voltage VDD is output as a reset signal RST. As a result, a reset period begins and the cathode side of a photoelectric conversion element D11 is reset by reset voltage VR.

When both the reset control signal Vrs21 and circuit connection signal SW24 go into a high-level state after a predetermined period of time, the pMOS transistor M21 goes into the OFF state, the circuit connection transistor M24 goes into the ON state, and the threshold voltage Vth of the blooming control transistor M23 is output with the reset voltage VR as a reference. This is a state in which control voltage Vcont for setting a cutoff frequency for a low-pass filter formed by a reset transistor M11 and the photoelectric conversion element D11 is output.

After a predetermined period of time elapsed, the reset control signal Vrs22 and circuit connection signal SW24 go into a high-level state and low-level state respectively, the nMOS transistor M22 and circuit connection transistor M24 go into the ON state and OFF state respectively, and the reset period ends. At this time the potential of a node for a reset signal RST is about the threshold voltage Vth of the blooming control transistor M23 with GND potential as a reference. This prevents a blooming phenomenon.

With the above voltage control circuit 22a, a cutoff frequency for the low-pass filter formed by the reset transistor M11 and the photoelectric conversion element D11 can be set freely by controlling the value of control voltage Vcont output as a reset signal RST according to the threshold voltage Vth of the blooming control transistor M23. In this case, the blooming control transistor M23 should be selected so that a cutoff frequency will not exceed the upper limit of a frequency band where the differential amplifier 30a operates. By doing so, all of the kTC noise can be reduced in a wide frequency band.

To prevent an error in cutoff frequency due to process variation from occurring, the blooming control transistor M23 should be selected according to according to the ratio of the threshold voltage of the reset transistor M11 to the threshold voltage of the blooming control transistor M23. This is the same with the case of FIG. 4.

As stated above, if the differential amplifier 30a which operates by sharing elements in the pixel circuit 10a is located, a cutoff frequency for the low-pass filter formed by the reset transistor M11 and the photoelectric conversion element D11 is set to a value lower than or equal to the upper limit of a frequency band where the differential amplifier 30a operates by the use of the voltage control circuit 20a in order to reduce kTC noise in a wide band. In some cases, however, the effect of reducing kTC noise is not necessarily stable near the upper limit of a frequency band where the differential amplifier 30a operates.

In these cases, kTC noise can be reduced stably even in a frequency band near this upper limit by increasing bias current supplied to the differential amplifier 30a to raise the upper limit of a frequency band where the differential amplifier 30a can operate. Now, an example of the structure of a circuit which can increase this bias current will be described.

Figure 8:
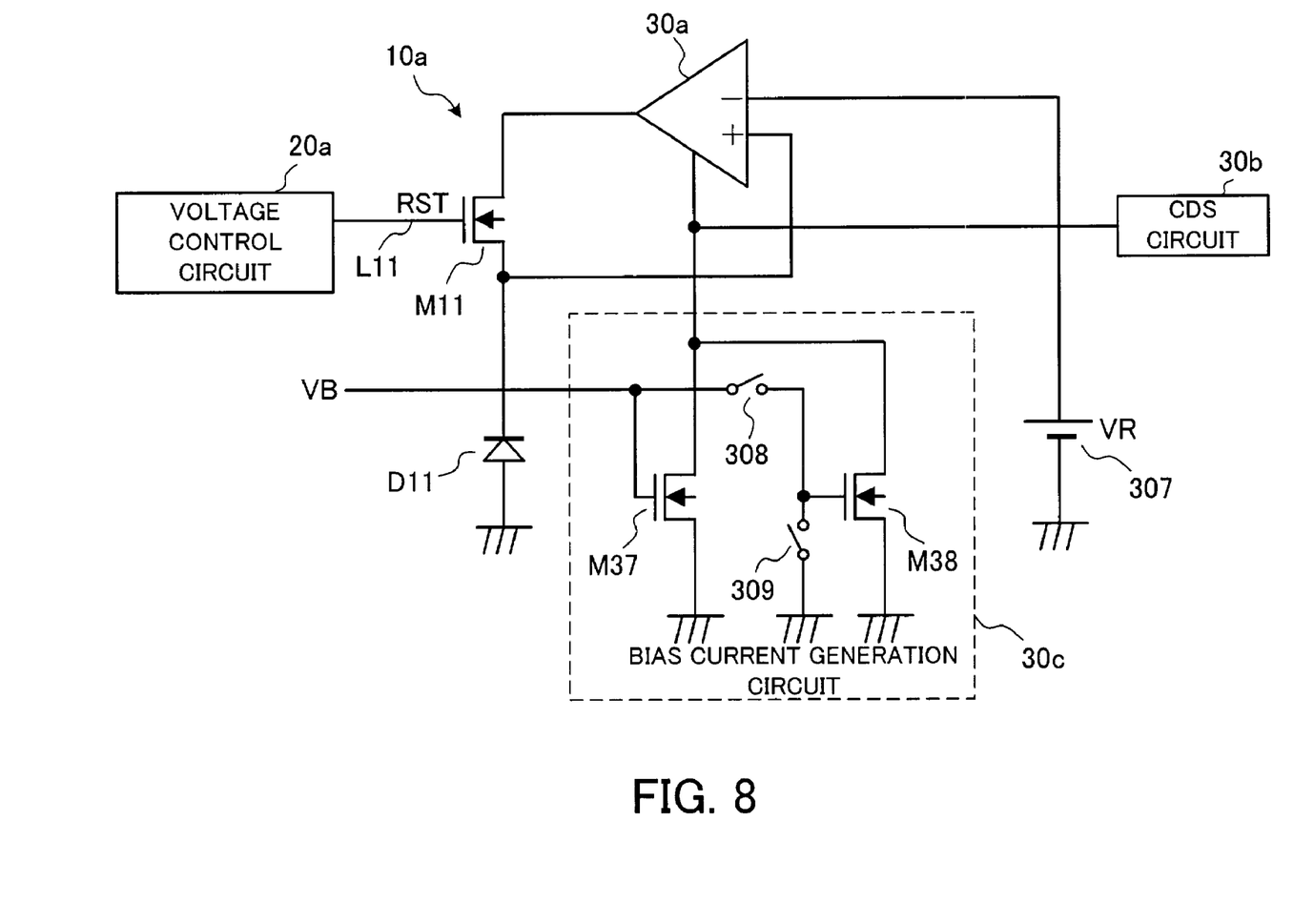
FIG. 8 is a view showing an example of the structure of a bias current generation circuit applicable to the present invention.

FIG. 8 is a view showing an example of the structure of a bias current generation circuit applicable to the present invention. For the sake of simplicity FIG. 8 shows the differential amplifier 30a as a block. The details of its circuit structure are omitted. This is the same with FIG. 7.

A bias current generation circuit 30c shown in FIG. 8 corresponds to the constant current source 301 in the circuit structure of the differential amplifier 30a shown in FIG. 5 and is located in the amplifier/noise cancel circuit 30. The bias current generation circuit 30c includes transistors M37 and M38 for supplying constant current which differ from each other in capacity. For example, the transistor M38 has ten times the current amplification factor of the transistor M37.

Drain of the transistors M37 and M38 are connected to the column selection signal line L14. Reference voltage VB for generating bias current is supplied to a gate of the transistor M37. On the other hand, reference voltage VB is applied to a gate of the transistor M38 in the case of a circuit changeover switch 308 being turned to ON and the gate of the transistor M38 is grounded in the case of a circuit changeover switch 309 being turned to ON.

The circuit changeover switch 308 is turned to ON or OFF in synchronization with a circuit switching signal SW30 input to the circuit switching transistors M31 and M35 in the differential amplifier 30a. The circuit changeover switch 309 is turned to ON or OFF in synchronization with a signal the polarity of which is reverse to that of the circuit switching signal SW30. Therefore, only while the differential amplifier 30a is operating, the transistor M38 is in the ON state and the bias current generation circuit 30c increases bias current supplied to the differential amplifier 30a.

As a result, a frequency band where the differential amplifier 30a can operate will widen and the upper limit of this frequency band will always considerably exceed a cutoff frequency for a low-pass filter set by the voltage control circuit 20a. Therefore, there is no omission of a frequency band of kTC noise which can be reduced. That is to say, kTC noise can be reduced stably in a wide frequency band.

Moreover, by locating the circuit changeover switches 308 and 309, the operation of the transistor M38 is also stopped when the operation of the differential amplifier 30a is stopped. As a result, a powerful bias current is not generated and consumption of power is reduced.

In the above example of the circuit structure of the differential amplifier 30a, a transistor having the same characteristics as the amplifying transistor M12 in the pixel circuit 10a was used as the first differential transistor M32. However, the ratio of the width and length of the gate may be shifted. That is to say, the threshold voltage of the first differential transistor M32 may be higher than that of the amplifying transistor M12. In this case, potential on the drain side of the reset transistor M11 rises and ON-state resistance of the reset transistor M11 increases. Therefore, a cutoff frequency for a low-pass filter formed by the reset transistor M11 and the photoelectric conversion element D11 can be made lower, resulting in a higher degree of freedom in the setting of this cutoff frequency by the voltage control circuit 20a.

As has been described in the foregoing, with the CMOS image sensor according to the present invention a voltage control circuit controls the potential of the gate of a reset transistor during a period when a photoelectric conversion element is reset to change ON-state resistance of the reset transistor. By doing so, a cutoff frequency for a low-pass filter formed in a pixel circuit by ON-state resistance of the reset transistor and parasitic capacitance produced at a cathode of the photoelectric conversion element will be controlled. Therefore, components at frequencies higher than and equal to an arbitrary one are shut out from an image signal output from the pixel circuit and the high frequency components of kTC noise can be reduced.

Furthermore, a differential amplifier which operates by using, for example, an amplifying transistor and row selection transistor as part of its circuit structure may be located. This differential amplifier operates only from the beginning of a reset period or from just before the reset period to the end of the reset period to reduce the components of kTC noise at frequencies lower than and equal to a predetermined one. Therefore, kTC noise can be reduced in a wide band not only by the characteristic of the above low-pass filter but also by the function of this differential amplifier.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A CMOS image sensor for getting images by outputting in order image signals sensed in each of pixel areas arranged like a matrix on the basis of X-Y addressing, the sensor comprising:
pixel circuits each including:
a photoelectric conversion element for carrying out the photoelectric conversion of incident light,
a reset transistor for resetting a cathode of the photoelectric conversion element to initial voltage,
an amplifying transistor for converting electric charges accumulated in the photoelectric conversion element to voltage, and
a row selection transistor for outputting voltage output from the amplifying transistor as image signals corresponding to one pixel on the basis of a row selection signal to select signals output from the pixel areas arranged in a row direction; and
a voltage control circuit for controlling a cutoff frequency for a low-pass filter formed by ON-state resistance of the reset transistor and parasitic capacitance produced at the cathode of the photoelectric conversion element during a period when the photoelectric conversion element is reset by controlling a potential of a gate of the reset transistor,
wherein after setting the potential of the gate of the reset transistor to a power supply potential during the period when the photoelectric conversion element is reset to reset the cathode of the photoelectric conversion element to the initial voltage, the voltage control circuit sets the potential of the gate of the reset transistor to a frequency control potential for controlling the cutoff frequency.

2. The CMOS image sensor according to claim 1, wherein the voltage control circuit including:
an inverter circuit including a p-channel MOS transistor and n-channel MOS transistor for driving the gate of the reset transistor; and
a blooming control transistor located between a drain of the p-channel MOS transistor and a drain of the n-channel MOS transistor.

3. The CMOS image sensor according to claim 2, wherein the blooming control transistor is a MOS transistor a gate and drain of which are connected to the gate of the reset transistor.

4. The CMOS image sensor according to claim 3, wherein when the cutoff frequency is controlled, the p-channel MOS transistor or the n-channel MOS transistor connected to the drain of the blooming control transistor is put into an ON state, the n-channel MOS transistor or the p-channel MOS transistor connected to a source of the blooming control transistor is put into an OFF state, and the initial voltage is supplied to the source of the blooming control transistor.

5. The CMOS image sensor according to claim 3, wherein when the cutoff frequency is controlled, the voltage control circuit sets the potential of the gate of the reset transistor according to the ratio of a threshold voltage of the reset transistor to a threshold voltage of the blooming control transistor.

6. The CMOS image sensor according to claim 1, wherein the voltage control circuit controls the potential of the gate of the reset transistor so that the reset transistor will not completely go into an OFF state except during the period when the photoelectric conversion element is reset.

7. The CMOS image sensor according to claim 1, further comprising a differential amplifier which operates from the beginning of the period when the photoelectric conversion element is reset or from just before the period when the photoelectric conversion element is reset to the end of the period when the photoelectric conversion element is reset by using the amplifying transistor and the row selection transistor as part of circuit structure thereof.

8. The CMOS image sensor according to claim 7, wherein the voltage control circuit controls the potential of the gate of the reset transistor so that the cutoff frequency will be lower than or equal to an upper limit value of a frequency range where the differential amplifier operates.

9. The CMOS image sensor according to claim 7, wherein: the differential amplifier includes a first differential transistor to which the initial voltage is supplied during a period when the differential amplifier operates; and the amplifying transistor is used as a second differential transistor, being the pair to the first differential transistor, during the period when the differential amplifier operates.

10. The CMOS image sensor according to claim 9, wherein the differential amplifier includes a circuit switching transistor for electrically connecting the amplifying transistor and the row selection transistor to the first differential transistor during the period when the differential amplifier operates and for electrically separating the amplifying transistor and the row selection transistor from the first differential transistor except during the period when the photoelectric conversion element is reset.

11. The CMOS image sensor according to claim 9, wherein in the differential amplifier a threshold voltage of the first differential transistor is higher than a threshold voltage of the amplifying transistor.

12. The CMOS image sensor according to claim 7, further comprising a bias control circuit for increasing bias current supplied to the differential amplifier during the period when the differential amplifier operates.

\* \* \* \* \*